United States Patent
Pomaranski et al.

(10) Patent No.: US 7,143,236 B2
(45) Date of Patent: Nov. 28, 2006

(54) PERSISTENT VOLATILE MEMORY FAULT TRACKING USING ENTRIES IN THE NON-VOLATILE MEMORY OF A FAULT STORAGE UNIT

(75) Inventors: Ken Gary Pomaranski, Roseville, CA (US); Thane Michael Larson, Roseville, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 405 days.

(21) Appl. No.: 10/630,994

(22) Filed: Jul. 30, 2003

(65) Prior Publication Data

US 2005/0028038 A1  Feb. 3, 2005

(51) Int. Cl.
 *G06F 11/07* (2006.01)
(52) U.S. Cl. .............................. 711/115; 711/5; 714/5; 714/42
(58) Field of Classification Search ................. 711/115
 See application file for complete search history.

(56) References Cited

U.S. PATENT DOCUMENTS

| | | | |
|---|---|---|---|
| 3,693,052 A * | 9/1972 | Galanti ........................ 361/773 |
| 4,633,467 A * | 12/1986 | Abel et al. ..................... 714/45 |
| 4,964,129 A * | 10/1990 | Bowden et al. ............. 714/764 |
| 5,774,647 A * | 6/1998 | Raynham et al. ............. 714/48 |
| 5,862,314 A * | 1/1999 | Jeddeloh ......................... 714/8 |
| 5,953,243 A | 9/1999 | Capps et al. |
| 6,052,798 A * | 4/2000 | Jeddeloh ......................... 714/8 |
| 6,282,689 B1 | 8/2001 | Seyyedy |
| 6,330,637 B1 | 12/2001 | Ryan |
| 6,330,696 B1 | 12/2001 | Zorian et al. |
| 6,493,843 B1 | 12/2002 | Raynham |
| 6,496,945 B1 * | 12/2002 | Cepulis et al. ................. 714/25 |
| 6,651,138 B1 * | 11/2003 | Lai et al. ..................... 711/115 |
| 6,976,197 B1 * | 12/2005 | Faust et al. .................. 714/723 |
| 2003/0110426 A1 * | 6/2003 | Faust et al. .................. 714/723 |

OTHER PUBLICATIONS

"Non-Volatile Memory: The principles, the technologies, and their signifance to the smart card integrated circuit", David Sowards, 1999, Emosyn and Silicon Storage Technology, pp. 1-13.*

* cited by examiner

*Primary Examiner*—Sanjiv Shah
*Assistant Examiner*—Arpan Savla

(57) ABSTRACT

One embodiment disclosed relates to a method for persistently tracking volatile memory faults. A memory error is detected in relation to at least one dynamic random access memory (DRAM) unit on a particular memory module. An entry pertaining to the memory error is written in non-volatile memory of a fault storage unit on that particular memory module. Another embodiment disclosed relates to a memory module that persistently tracks volatile memory faults. The memory module includes a plurality of dynamic random access memories (DRAMs) and a fault storage unit. The fault storage unit includes non-volatile memory configured to store entries pertaining to faults in the plurality of DRAMs on that memory module.

5 Claims, 7 Drawing Sheets

| DRAM # 602 | Start bit of error 604 | End bit of error 606 |
|---|---|---|
| | | |
| | | |
| | | |

PERSISTENT VOLATILE MEMORY FAULT TRACKING USING ENTRIES IN THE NON-VOLATILE MEMORY OF A FAULT STORAGE UNIT

BACKGROUND OF THE INVENTION

1. Field of the Invention

The present invention relates generally to computer systems. More particularly, the present invention relates to memory systems.

2. Description of the Background Art

In today's computer industry, dynamic random access memories (DRAMs) are one of the dominant memory technologies. DRAMs are the preferred choice for large main memories because they are inexpensive, fast and consume little power. DRAMs are typically manufactured in discrete semiconductor packages having different input/output (I/O) data widths of, for example, sixteen, thirty-two, or sixty-four, or more data bits.

The number of data bits that a computer can simultaneously address and manipulate, i.e., the computer bus width, is typically much larger than that commonly available with DRAMs. To accommodate these bus widths, groups of DRAMs are typically packaged together to form memory modules, such as, for example, DIMMs (Dual In-line Memory Modules) and other types of memory modules.

FIG. 1A shows a side view of a conventional memory system 100 with two DIMM modules. The memory system 100 includes a CPU or memory controller 102 affixed to a motherboard 106 and two dual in line memory modules 108a and 108b. The two memory modules 108a–b shown each includes N memory devices 112 connected in parallel. Assuming for purposes of discussion that N is equal to eighteen, the eighteen memory devices 112a–N on each memory module 108a and 108b are connected to the memory controller 102 by a data bus 114, which includes board trace portions 116, a connectors 118 and a module trace portions 120.

FIG. 1B shows a block diagram of the memory structure of the memory modules of the memory system 100 shown in FIG. 1A. In FIG. 1B, the data bus is 72 bits wide where 64 bits are used for data and 8 bits are used for error correction. Each of the eighteen memory devices on the memory module 108a–b is 4 bits. The eighteen memory devices are connected in parallel so that for each memory operation, the output onto the data bus 114 is 72 bits wide.

FIG. 1C shows a clock pulse for reading or writing to a memory location of the memory system 100 shown in FIG. 1A. The memory controller 102 reads a single word or memory location from a single memory module at a time. Assuming a single data rate (SDR) system and a read operation, the memory location in memory module 108 having the address 000000 is read at the clock edge $t_1$. The contents of the memory location is 72 bits wide. No memory operation occurs at clock edge $t_2$. A second memory location having the address location 000001 in memory module 108 is read at the clock edge $t_3$.

FIG. 2A shows a side view of a conventional memory system 200 having eight DIMM modules. Similar to the configuration shown In FIG. 1A, the memory system 200 shown in FIG. 2A includes a CPU or memory controller 202 affixed to a motherboard 206. However, this configuration includes eight dual in line memory modules 208a–h instead of the two DIMMs 108a–b shown in FIG. 1A. The eight memory modules 208a–h shown each includes N memory devices 212, The memory controller 202 is connected to the eight memory modules 208a–h by a data bus 214, which includes board trace portions 216, connectors 218 and module trace portions 220.

FIG. 2B shows a block diagram of the memory structure of the memory system 200 shown in FIG. 2A. In the system shown, the data bus is 144 bits wide where 128 bits are used for data and 16 bits are used for error correction. Preferably each memory module Includes eighteen memory devices (N=18), each memory device being 4 bits wide. For each memory module, the memory devices are connected in parallel. Data is read from two memory modules simultaneously, so that for each memory operation, the output onto the data bus 214 is 144 bits wide.

FIG. 2C shows a clock pulse for reading or writing to a memory location of the memory system 200 shown in FIG. 2A. The memory controller 202 reads a single word or memory location from a single memory module at a time. Assuming a double data rate (DDR) system and a memory read operation, the memory location in memory module 208a having the address 000000 and the memory location in memory module 208e having the address 000000 are both read simultaneously at the clock edge $t_1$. A second memory location in memory module 208a having the address location 000001 and a second memory location having the address 000001 in memory module 208e are both read simultaneously at the clock edge $t_2$.

The above-discussed relatively simple memory systems are merely illustrative examples discussed for background purposes. There are numerous other memory system configurations, some much larger and more complex than those discussed above. With the ubiquity of memory systems in computer systems, improvements in the methods and apparatus for utilizing and maintaining such memory systems are highly desirable.

SUMMARY

One embodiment of the invention pertains to a method for persistently tracking volatile memory faults. A memory error is detected in relation to at least one dynamic random access memory (DRAM) unit on a particular memory module. An entry pertaining to the memory error is written in non-volatile memory of a fault storage unit on that particular memory module.

Another embodiment of the invention pertains to a memory module that persistently tracks volatile memory faults. The memory module includes a plurality of dynamic random access memories (DRAMs) and a fault storage unit. The fault storage unit includes non-volatile memory configured to store entries pertaining to faults in the plurality of DRAMs on that memory module.

Another embodiment of the invention pertains to a circuit board that includes a plurality of connectors configured to connect to a plurality of memory modules, a memory controller, and a memory error interface. The memory controller is configured to read and write data into volatile memory units of the memory modules, while the memory error interface is configured to provide read and write access to non-volatile fault storage units of the memory modules.

BRIEF DESCRIPTION OF THE DRAWINGS

FIG. 6 depicts fields of memory error entries in a fault storage unit in accordance with an embodiment of the invention.

DETAILED DESCRIPTION

A computer memory system may include anywhere from a few DIMMs (for example, in a personal computer or a small server) to thousands of DIMMs (for example, in a large server system). High end servers also typically include high availability features such as memory chip redundancy and hot swapping. When a permanent memory error occurs (for example, a stuck-at bit, a stuck-open bit, or a "weak cell"), the location of the error is typically kept in system logs. The system logs reside in a central location such as a disk drive of the system, or on the system board. The system log typically tracks the DIMM number and DRAM location that has the error.

This technique of tracking may work sufficiently well if that DIMM is not moved. However, if the DIMM is moved to another physical location (for example, another slot) in the same system or in a different system (for example, a system used for debug purposes), then the error tracking is lost. This is because the error information resides on the host system and pertains to a particular location in the host system.

An embodiment of the present invention provides a means to persistently track a permanent memory error on a memory module, even if the memory module is moved to a new physical location. In accordance with an embodiment of the invention, the fault information is stored locally on the particular DIMM that has the memory error. Hence, when and if that DIMM is moved, the error information moves along with the DIMM. If the new location is in a new host system (or in a new location in the same system), then this embodiment allows for the system to proactively deal with the fault, rather than having to discover it again after another memory error. For example, when a DIMM configured in accordance with an embodiment of the invention is plugged into a system, the existing known errors that have been persistently tracked may be dealt with by a "fault handler" routine, instead of the operating system having to rediscover the errors. Rediscovery of such errors is itself error prone and may result in system crashes.

In one application of this embodiment, when a DIMM is physically moved to a debug system for debugging purposes, either at a customer site or at a repair center, this embodiment significantly facilitates the process to debug the error. This is because the tool for debugging the DIMM may be configured to have access to all the DRAM bits that went bad. This information would give a person debugging a much clearer picture of what occurred. In other words, the memory error history aids in debugging of the DIMM, which decreases downtime and reduces maintenance costs.

Figure 3:
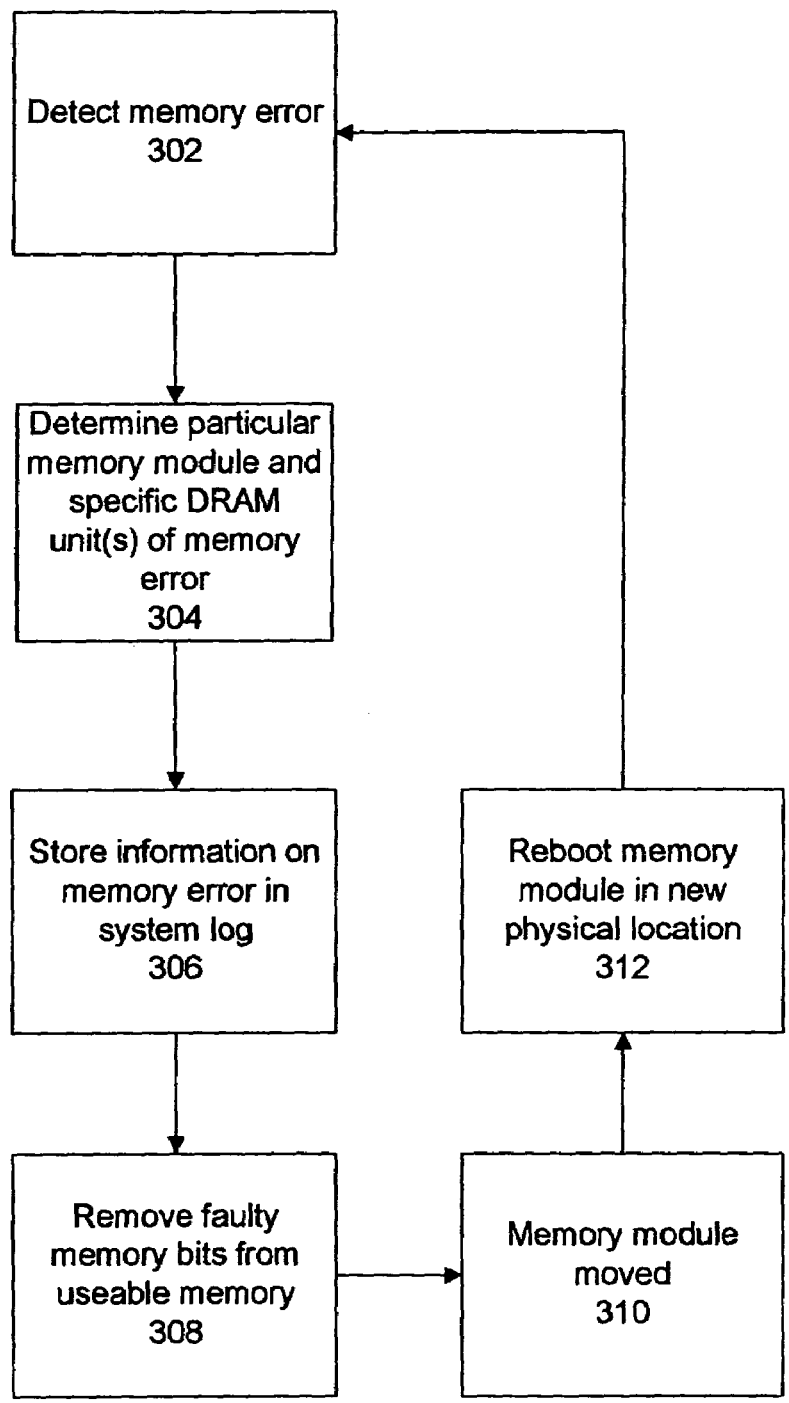
FIG. 3 is a flow chart of a conventional method of tracking volatile memory faults.

FIG. 3 is a flow chart of a conventional method of tracking volatile memory faults. Sometime during the operation of the computer system, a memory error is detected 302. The specific location of the memory error is determined 304. The memory error detection 302 and location determination 304 may be performed, for example, by the operating system. The specific location may be indicated as being at specific address(es) of specific DRAM(s) on a particular memory module.

To track the memory error, the memory error information is stored 306 in a system log. The system log may be kept, for example, on the system board or on a system disk. The memory error information may be used to remove 308 the faulty memory bits from the set of useable memory that is actively utilized by the computer system.

In such a conventional system, if a memory module with memory errors thereon is moved 310 and rebooted 312 in a new physical location, then the tracking of the memory errors no longer applies to that module. This is because the memory error information is correlated to a particular physical location for the memory module. Hence, after such a move, the memory error information is lost, until it is re-detected 302, for example, by the operating system. Disadvantageously, such re-detection 302 involves the occurrence of another memory based error and may involve a detrimental result such as a system crash.

Figure 4:
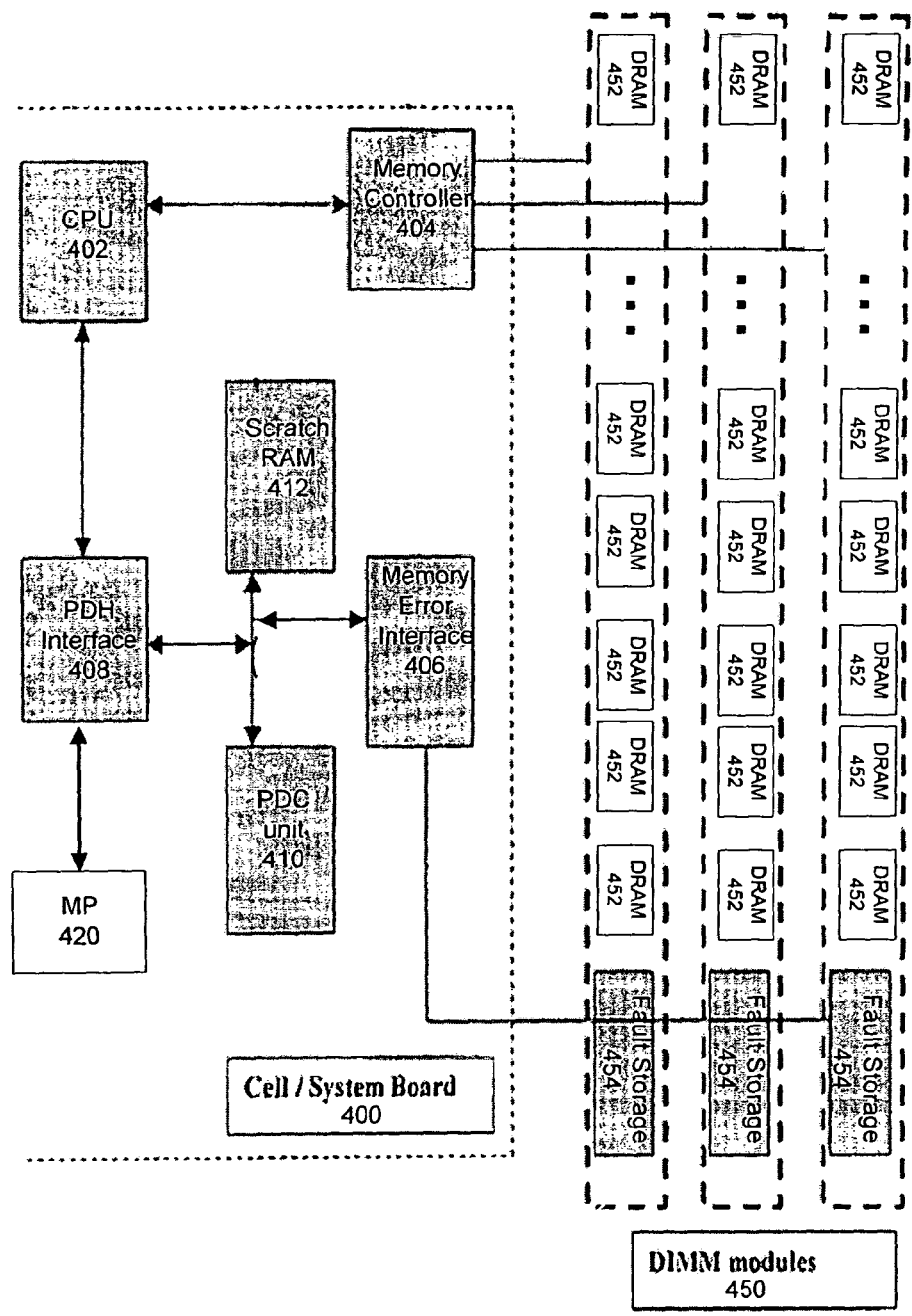
FIG. 4 is a schematic diagram of a system for persistently tracking volatile memory faults in accordance with an embodiment of the invention.

FIG. 4 is a schematic diagram of a system for persistently tracking volatile memory faults in accordance with an embodiment of the invention. The system includes a system board 400 and multiple DIMM modules 450. In some larger computing systems, the system board 400 may be referred to as a cell board 400.

The system board 400 includes various components. A central processor unit (CPU) 402 executes software instructions and operates as a "brain" that coordinates the operation of other components on the board 400. Although one CPU 402 is illustrated, an actual system may utilize a single CPU or multiple CPUs 402 for this functionality. The CPU 402 is shown as communicatively coupled to a memory controller 404 and a processor dependent hardware (PDH) interface 408. These communicative couplings may comprise, for example, a communications bus or other communications means. Other components (not illustrated) may also, of course, be communicatively coupled to the CPU 402, such as an input/output interface, a data storage interface, a display interface, and other devices.

Figure 1B:
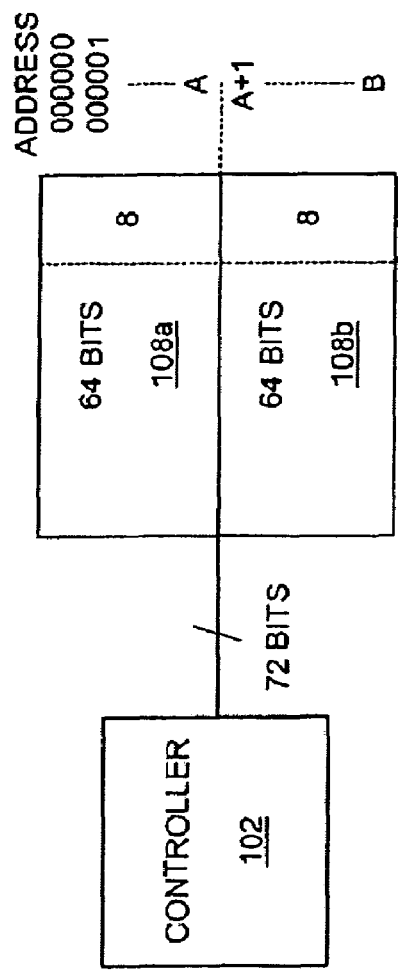
FIG. 1B shows a block diagram of the memory structure of the memory modules of the memory system shown in FIG. 1A.
Figure 1C:
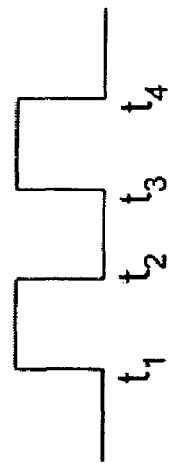
FIG. 1C shows a clock pulse for reading or writing to a memory location of the memory system shown in FIG. 1A.
Figure 1A:
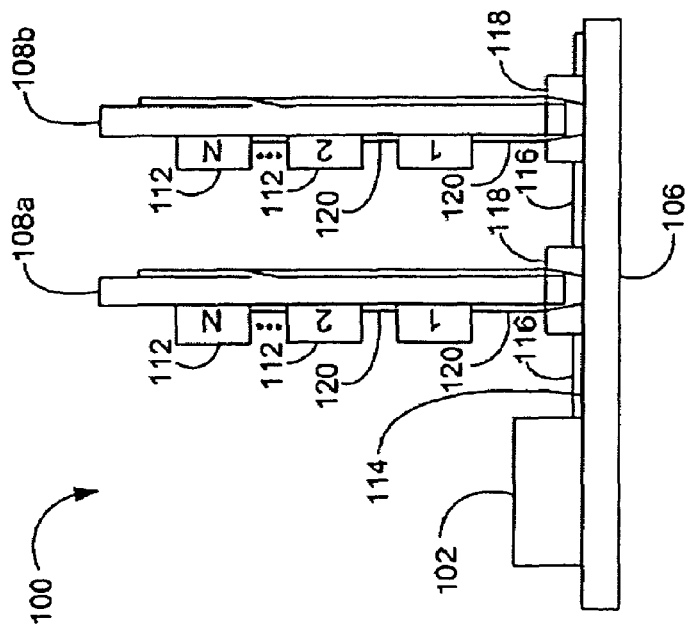
FIG. 1A shows a side view of a conventional memory system having two DIMM modules.
Figure 2A:
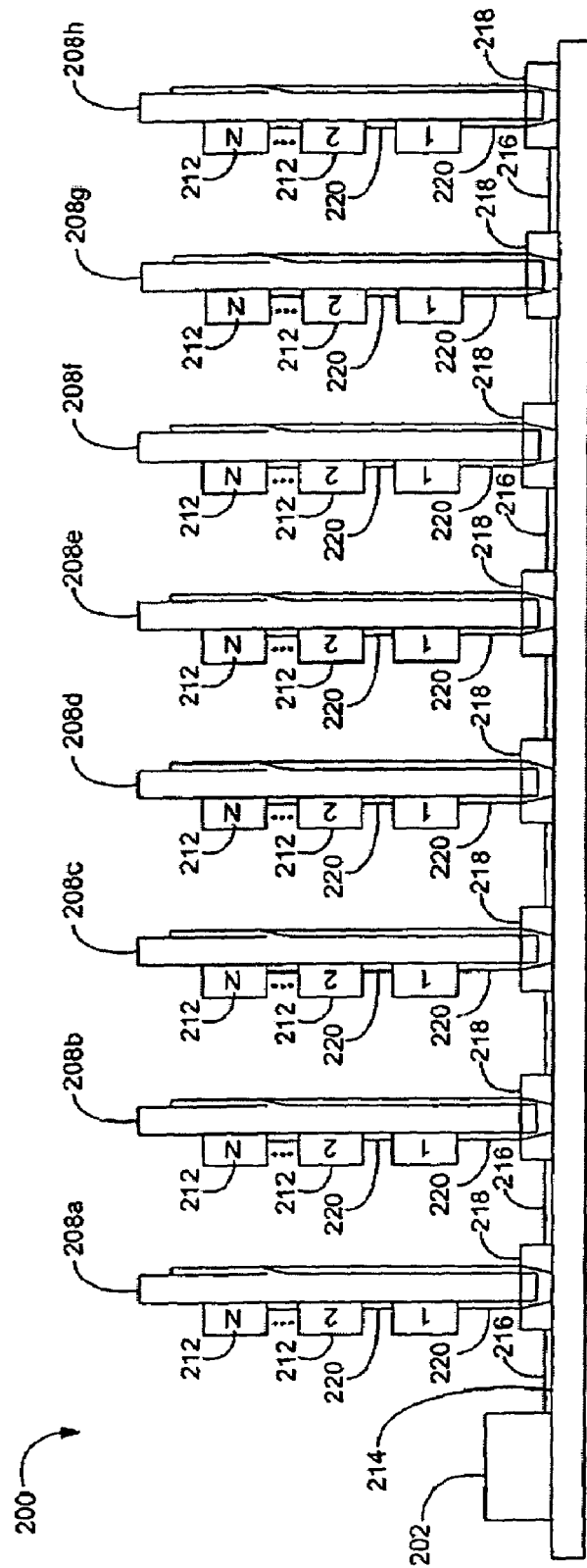
FIG. 2A shows a side view of a conventional memory system having eight DIMM modules.
Figure 2B:
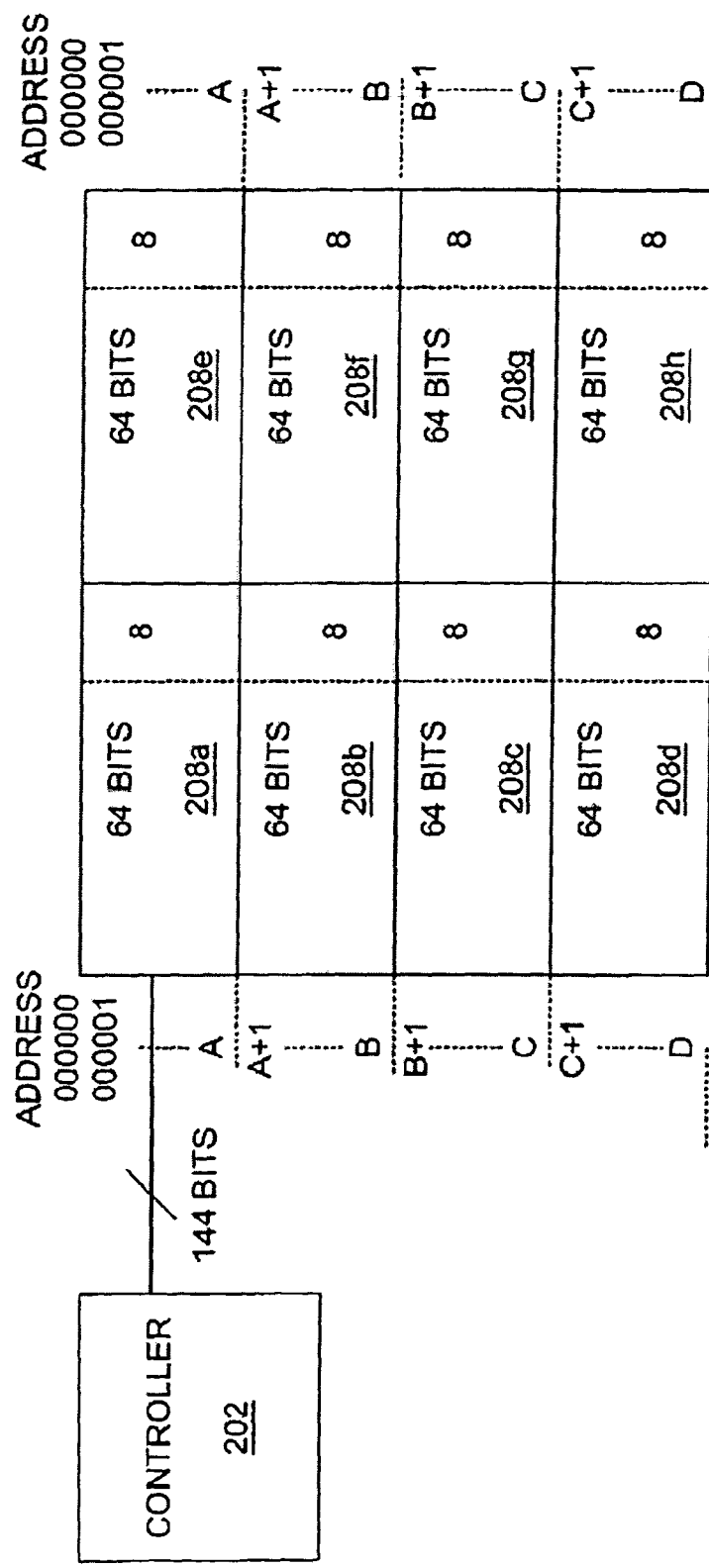
FIG. 2B shows a block diagram of the memory structure of the memory system shown in FIG. 2A.
Figure 2C:
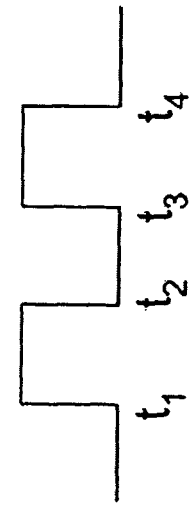
FIG. 2C shows a clock pulse for reading or writing to a memory location of the memory system shown in FIG. 2A.

The memory controller 404 is used to control the reading of data from and writing of data to the DRAM chips on the DIMM modules 450. The memory controller 404 may be implemented to operate, for example, similarly to the memory controllers discussed above in relation to FIGS. 1 and 2. The specific operation of the memory controller 404 will depend upon the specific characteristics of the memory being controlled (for example, whether the DRAM is asynchronous or synchronous, whether the DRAM is single data rate or double data rate, whether it is direct Rambus® DRAM (DRDRAM®), and so on). Embodiments of the present invention should not typically be limited to a particular type of DRAM.

In one embodiment, a manageability processor (MP) 420 may be included on the system board 400. The MP 420 may be used to control the monitoring of status, the logging of events and abnormal conditions, and the recovery capabilities in relation to the memory system. In one embodiment, the manageability processor 420 may be configured to be compliant with the intelligent platform management interface (IPMI) specification. The IPMI specification is currently available from Intel via the Internet. The Intelligent Management Platform provides functions that are available independent of the main processors, BIOS, and operating system. IPMI messaging uses a request/response protocol. IPMI request messages (also called commands) are grouped into functional command sets, using a field called the network function code. There are command sets for sensor and event related commands, chassis commands, and so on.

The PDH interface 408 allows the CPU 402 and/or the MP 420 to communicate with other components shown, including a processor dependent code (PDC) unit 410, scratch memory 412, and a memory error interface unit 406. In the embodiment illustrated in FIG. 4, the system board 400 includes both the CPU 402 and the MP 420 and both are communicatively coupled to the PDH interface 408. In another embodiment, the system board 400 includes both the CPU 402 and the MP 420, but only the MP 420 is communicatively coupled to the PDH interface 408. In another embodiment, the system board 400 includes only the CPU 402 and not the MP 420.

The PDH interface 408 may be implemented using a microcontroller. The PDC unit 410 may comprise a form of non-volatile memory, such as, for instance, flash memory or a type of read only memory (ROM). The PDC unit 410 may be configured to include boot code and error handling code to be executed by one of the processors on the system board 400. The scratch memory 412 may be implemented using volatile and/or non-volatile scratch RAM. The scratch memory 412 is utilized to temporarily store data.

The memory error interface 406 is communicatively coupled to the fault storage units 454 on the DIMM modules 450. The memory error interface 406 is configured with circuitry to enable read and write access to the fault storage units 454. More specifically, the memory error interface 406 writes and reads memory error data to and from the fault storage units 454.

There are at least three DIMM modules 450 depicted in FIG. 4, but embodiments of the present invention are not limited to a specific number of memory modules. Furthermore, although DIMMs 450 are depicted and discussed, embodiments of the present invention need not necessarily be limited to a specific type of memory module. Other types of memory modules include single in-line memory modules (SIMMs), Rambus in-line memory modules (RIMMs®), and others.

Each memory module 450 couples to the system board by way of a memory slot. The memory slot is configured appropriately depending on the type of memory module. Again, while at least three memory slots are illustrated in FIG. 4, embodiments of the invention are not limited to a specific number of memory slots.

Each memory module 450 includes a plurality of DRAM chips 452 and a fault storage unit 454. The DRAMs 452 comprise volatile memory in that they require the application of power to retain data therein. In contrast, the fault storage units 454 comprise non-volatile memory in that they retain data therein regardless of the application of power thereto. Each memory module 450 also includes circuitry configured to provide read and write access by the memory controller 404 to the DRAMs 452 and circuitry configured to provide read and write access by the memory error interface 406 to the fault storage 454. In accordance with an embodiment of the invention, the fault storage unit 454 on each memory module 450 advantageously stores entries pertaining to faults in the plurality of DRAMs 452 on that same memory module 450.

Figure 5:
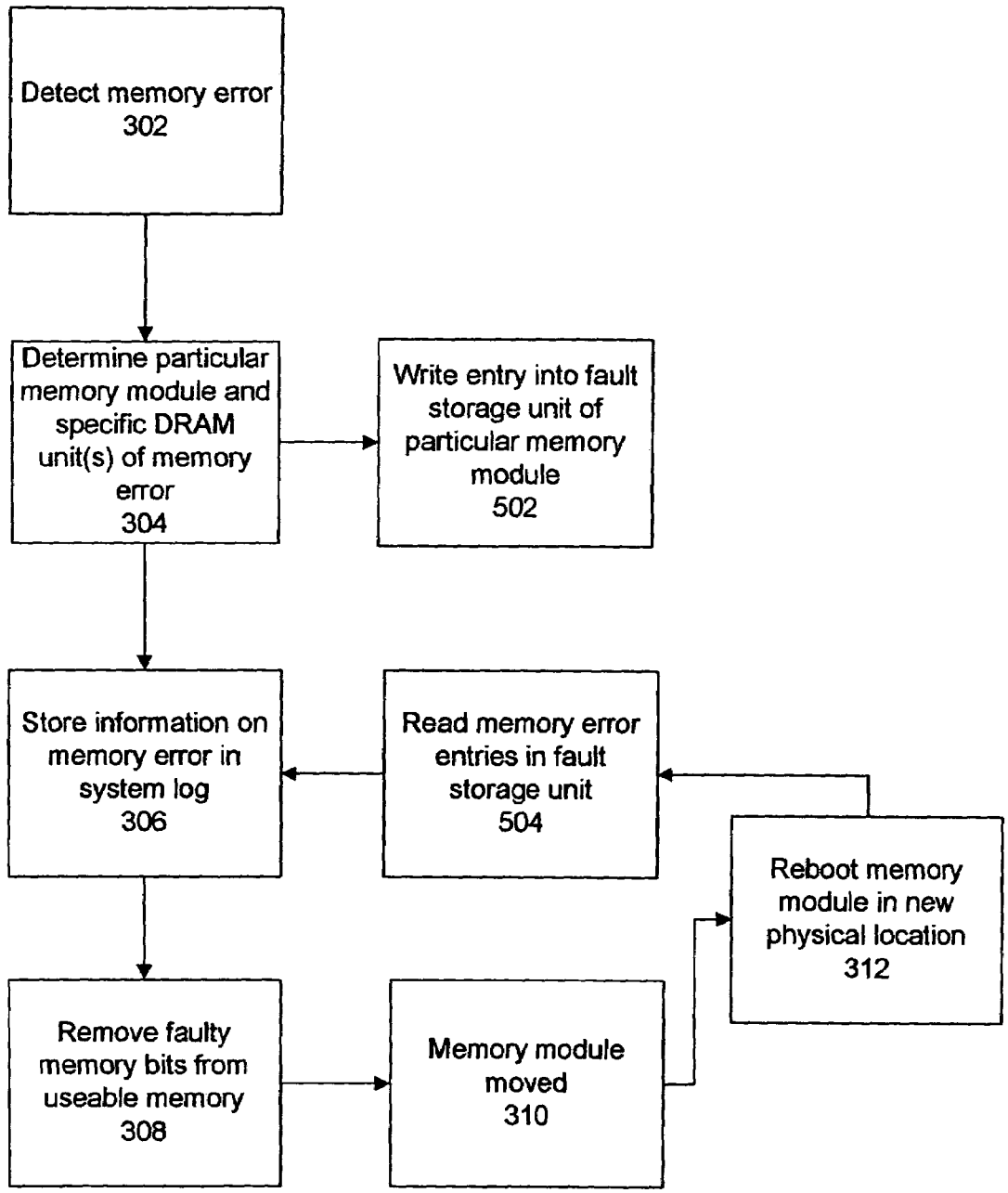
FIG. 5 is a flow chart of a method of persistently tracking volatile memory faults in accordance with an embodiment of the invention.

FIG. 5 is a flow chart of a method of persistently tracking volatile memory faults in accordance with an embodiment of the invention. This method is advantageous over the conventional method of FIG. 3.

Like in the conventional method of FIG. 3, sometime during the operation of the computer system, a memory error is detected 302. The specific location of the memory error is determined 304. The memory error detection 302 and location determination 304 may be performed, for example, by the operating system. The specific location may be indicated as being at specific address(es) of specific DRAM(s) on a particular memory module. To track the memory error, the memory error information is stored 306 in a system log. The system log may be kept, for example, on the system board or on a system disk. The memory error information may be used to remove 308 the faulty memory bits from the set of useable memory that is actively utilized by the computer system.

In accordance with an embodiment of the invention, in addition to the memory error information being stored 306 in the system log, the memory error information is also written 502 into the non-volatile memory of the fault storage unit on the same memory module as that which contains the memory error. This step 502 may be performed under the control of the error handler code in the PDC unit. The memory error information may be written in the form of an entry in a memory error table. An example of such a table is described below in relation to FIG. 6.

In accordance with an embodiment of the invention, even if a memory module with memory errors thereon is moved 310 to a new physical location, the tracking of the memory errors on that module still persists. This is because the memory error information is stored persistently in the non-volatile memory of the fault storage unit on that module. Hence, when the memory module is rebooted 312 in its new physical location, the boot code in the PDC unit may be executed to obtain the memory error information by reading 504 the memory error entries in the fault storage unit on that module. Advantageously, obtaining the memory error information from the fault storage unit avoids the need for the operating system to re-detect 302 the memory errors on the moved module, preventing unnecessary memory based errors and possible system crashes.

FIG. 6 depicts fields of memory error entries in a fault storage unit in accordance with an embodiment of the invention. As shown, the memory error table may include various fields for each entry, each field corresponding to a column in the illustrated table and each entry corresponding to a row in the illustrated table.

In one implementation, the fields include a DRAM number 602, a start bit of the memory error 604, and an end bit of the memory error 606. The DRAM number 602 indicates a specific DRAM chip on the memory module in which the error is located. The bit range in the DRAM which includes the faulty memory bits are indicated by the start 604 and end 606 bits. If the group of bits related to a memory error are not contiguous, then more than one entry would be used to store the memory error information in the fault storage unit.

Other implementations of the memory error table may also be used in accordance with other embodiments of the invention. For example, additional fields may be included, such as, for example, a field indicating the last time at which the memory error was detected and the number of times the bit range has failed. A requirement of the memory error table is that the table indicates the specific location of detected memory errors, including the specific DRAM chip and the specific bit(s) therein.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A circuit board of a system, the circuit board comprising:
   a plurality of connectors, each connector connects to a memory module which includes multiple volatile memory units and a non-volatile fault storage unit;
   a memory controller configured to read and write data into the volatile memory units of memory modules;
   a memory error interface configured to provide read and write access to the non-volatile fault storage units of the memory modules; and
   a computer-readable medium including computer-readable error handling code configured to write entries relating to detected memory errors into the non-volatile fault storage unit and to read said entries from the non-volatile fault storage unit,
   wherein each said entry comprises a memory unit identifier, a start bit of a memory error, an end bit of the memory error, and tag bits indicating time of last failure and number of occurrences of failure.

2. The circuit board of claim 1, further comprising:
   a processor dependent hardware (PDH) interface communicatively coupled between a central processing unit and the memory error interface.

3. The circuit board of claim 2, further comprising:
   a processor dependent code (PDC) unit accessible via the PDH interface,
   wherein the PDC unit includes said computer-readable medium, and
   wherein said computer-readable medium further includes computer-readable boot code.

4. The circuit board of claim 3, wherein the computer-readable boot code is configured to read the entries from the non-volatile fault storage unit and to remove memory bits associated with the entries from a set of usable memory.

5. The circuit board of claim 1, wherein the volatile memory units comprise dynamic random access memory, and wherein the plurality of memory modules comprise dual in-line memory modules (DIMMs).

* * * * *